(12) United States Patent
Gerwe et al.

(10) Patent No.: US 7,343,098 B2
(45) Date of Patent: Mar. 11, 2008

(54) FIBER OPTIC PHASED ARRAY AND ASSOCIATED METHOD FOR ACCOMMODATING ATMOSPHERIC PERTURBATIONS WITH PHASE AND AMPLITUDE CONTROL

(75) Inventors: David Roderick Gerwe, Woodland Hills, CA (US); Robert R. Rice, Simi Valley, CA (US); Harold B. Schall, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 658 days.

(21) Appl. No.: 10/738,001

(22) Filed: Dec. 17, 2003

(65) Prior Publication Data

US 2005/0135815 A1    Jun. 23, 2005

(51) Int. Cl.
*H04B 10/00* (2006.01)
(52) U.S. Cl. .................. 398/120; 398/119; 398/211
(58) Field of Classification Search ............... 356/512, 356/4.01–4.1; 250/201.9; 398/188, 162, 398/208–210, 119–120
See application file for complete search history.

(56) References Cited

U.S. PATENT DOCUMENTS

| | | | |
|---|---|---|---|
| 3,815,994 A * | 6/1974 | Peckham | 356/4.06 |
| 5,694,408 A * | 12/1997 | Bott et al. | 372/6 |
| 5,832,006 A | 11/1998 | Rice et al. | |
| 5,847,816 A | 12/1998 | Zediker et al. | |
| 5,847,817 A | 12/1998 | Zediker et al. | |
| 5,867,257 A | 2/1999 | Rice et al. | |
| 6,233,085 B1 | 5/2001 | Johnson | |
| 6,721,089 B1 * | 4/2004 | Miller et al. | 359/341.3 |
| 2002/0094158 A1 * | 7/2002 | Evans et al. | 385/27 |
| 2003/0062468 A1 * | 4/2003 | Byren et al. | 250/216 |

OTHER PUBLICATIONS

Jeffrey D. Barchers, Evaluation Of The Impact Of Finite-Resolution Effects On Scintillation Compensation Using Two Deformable Mirrors, *J. Opt. Soc. Am. A*, Dec. 2001, pp. 3098-3109, vol. 18, No. 12.

James P. Stone, David R. Gerwe, L. William Bradford and Michael R. Berry, Branch Cut Sensitive Wavefront Reconstruction For Low Elevation Viewing, *AMOS Technical Conference Proceedings*, 2001, pp. 276-285.

(Continued)

*Primary Examiner*—Agustin Bello
(74) *Attorney, Agent, or Firm*—Alston & Bird LLP

(57) ABSTRACT

A fiber optic phased array and control method are provided for controllably adjusting the phase and amplitude of the optical signals emitted by a plurality of fiber optic amplifiers to compensate for atmospheric turbulence. The fiber optic phased array also includes a sensor assembly for detecting: (i) the phase of the optical signals that are emitted by the fiber optic amplifiers, and (ii) both the phase and the amplitude of the optical signals that have been reflected by the target. The fiber optic phased array also includes phase modulators and a gain adjustment mechanism for altering the phase and the amplitude of the optical signals propagating along the fiber optic amplifiers to compensate for modifications in the phase and amplitude that will be introduced by atmospheric turbulence. Among other things, the amplitude control of the optical signals is not adversely effected by intensity nulls in the reflected wavefront.

17 Claims, 2 Drawing Sheets

OTHER PUBLICATIONS

David L. Fried, Adaptive Optics Wave Function Reconstruction And Phase Unwrapping When Branch Points Are Present, *Optics Communications*, 2001, pp. 1-28.

Troy A. Rhoadarmer, Jeffrey D. Barchers and Earl J. Spillar, Complex Field Reconstruction Using Gradient And Intensity Measurements From A Shack-Hartmann Wave Front Sensor, *Proc. SPEI*, Feb. 2002, vol. 4494, pp. 233-244.

Jeffrey D. Barchers, David L. Fried and Donald J. Link, Evaluation Of The Performance Of Hartmann Sensors In Strong Scintillation, *Applied Optics*, Feb. 2002, vol. 41(6), pp. 1012-1021.

* cited by examiner

FIBER OPTIC PHASED ARRAY AND ASSOCIATED METHOD FOR ACCOMMODATING ATMOSPHERIC PERTURBATIONS WITH PHASE AND AMPLITUDE CONTROL

FIELD OF THE INVENTION

The present invention relates generally to laser systems and, more particularly, to a fiber optic phased array and associated method for accommodating atmospheric perturbations with phase and amplitude control.

BACKGROUND OF THE INVENTION

Lasers are presently employed for a wide variety of applications. For example, lasers are employed to process materials, such as by cutting, welding, heat treating, drilling, trimming and coating materials, stripping paint, removing coatings, cleaning surfaces, and providing laser markings. Lasers are also used in many medical applications for precision surgery. Additionally, lasers are used in military applications, including laser weapon and laser ranging systems. Laser communication systems have also been developed in which laser signals are transmitted in a predetermined format to transmit data.

Along with the ever increasing number of applications in which lasers are used, the demands on the laser systems are also ever increasing. For example, a number of applications, including military, materials processing, medical, and communications applications, demand pulsed and continuous wave lasers which emit increasingly higher power levels. In addition, a number of applications demand that the laser system produce an output beam which is of high quality, such as by being diffraction limited and/or exhibiting predominantly or entirely fundamental or $TEM_{00}$ mode characteristics. Accordingly, the output beam can be more definitely focused to achieve higher brightness. At the same time, many applications require that the laser system produce an output beam which is adaptable or dynamically controllable.

One example of the need for high power, high quality laser beams is illustrated by the laser devices used to focus on remote targets. In these applications, it is advantageous for the laser beam to achieve a maximum brightness at the location of the target. For example, in military applications, it is advantageous to generate a laser beam that is focused on the remote target with maximum intensity. Similarly, in medical applications, it is essential that the laser beam be focused on the target tissue such that surrounding tissue is not affected.

Several different types of laser devices that generate high power laser beams have been developed by The Boeing Company, assignee of the present application. Examples of these laser device are discussed in detail in U.S. Pat. No. 5,694,408 to Bott et al. and U.S. Pat. No. 5,832,006 to Rice et al., the contents of which are incorporated herein by reference.

The basic approach of these laser devices is to amplify a coherent signal emitted from a master oscillator using a phased array of fiber optic amplifiers. A sample of the output optical signal is extracted for comparison to a reference laser beam that has also typically been output by the master oscillator. The sample of the output optical signal and the reference signal are combined by interference, and the interference signal is sampled by an array of detectors. The difference in phase between the sample of the output optical signal and the reference signal is recorded by the detector, and is used as feedback for altering the phase of the output optical signal via an array of phase modulators that are in optical communication with respective fiber optic amplifiers.

In one example, it may be desired that the plurality of output optical signals be capable of being combined into a diffraction limited signal, thereby requiring that the output optical signals emitted by the fiber optic amplifiers have a constant phasefront. Alternatively, the output optical signals emitted by the fiber optic amplifiers may desirably be shaped, steered or tilted in another predefined manner.

To provide the desired phasefront, the laser devices described by U.S. Pat. Nos. 5,694,408 and 5,832,006 have a feedback loop and an array of phase modulators that control the phase modulation of the output laser beam. Specifically, as discussed, a portion of the output laser beam is combined through interference with a reference signal to determine the phase difference for the signals emitted by each fiber optic amplifier. By use of the feedback signal representative of the phase of the output laser beam and knowledge of the desired wavefront, the output laser beam can be generally controlled via the array of phase modulators to produce the desired wavefront and/or to appropriately steer or tilt the wavefront.

Although these laser systems, for the most part, provide reliable and accurate control of the output laser beam, U.S. Pat. No. 6,233,085 to Bartley C. Johnson, the contents of which are also incorporated by reference herein, describes the feedback loop and the associated array of phase modulators in more detail. In this regard, the control methodology described by U.S. Pat. No. 6,233,085 patent can provide for a wide range of phase modulation by avoiding saturation and uncontrolled modulation changes in the output signal.

Once the output optical signals have been emitted by the laser device, atmospheric turbulence or other perturbations may undesirably alter the phase and/or amplitude of the optical signals prior to reaching the target. Thus, even if the laser device is controlled so as to emit optical signals having the desired amplitude and phasefront, the optical signals that are incident upon the target may not have the desired amplitude as a result of atmospheric turbulence. The spatial distribution of the phase and amplitude variations induced by atmospheric turbulence fluctuate on the order of milliseconds. Additionally, the atmospheric turbulence may create regions within the wavefront having zero intensity, i.e., intensity nulls. At such points the phase of the wave is undefined and thus following mathematical terminology are commonly referred to as branch points.

In an effort to address the effects of atmospheric turbulence, some laser devices alter the phases of the output optical signals in a predefined manner to compensate for the anticipated atmospheric turbulence. In this regard, the anticipated influences of the atmospheric turbulence on the signal may be estimated by transmitting a reference beam to the target and then analyzing the spatial variations of the phase of the signal after its reflection by the target and propagation back to the sensor. Optimal efficiency in achieving a tightly focused beam at a target is achieved when the complex amplitude of the outgoing signal is conjugate to that of the reflected reference signal (same intensity and opposite phase). By not adapting the spatial distribution of the phase of the transmitted signal to match that of the reflected reference signal, Strehl may reduced to 10% or even less than 1% depending on the strength of atmospheric turbulence and other optical aberrations and on the size of the aperture of the system. Not adapting the spatial distribution of the amplitude of the transmitted signal to match that of the reflected reference signal, may cause an additional 10-15% decrease in Strehl. Strehl is a metric of the peak intensity of the transmitted beam at the target relative to the peak that would occur for a diffraction limited beam. Futhermore, scintillation and associated branch points can have a profound reduction in the accuracy with which a wavefront sensor measures the wavefront phase resulting in severe drops in Strehl.

SUMMARY OF THE INVENTION

An improved fiber optic phased array and associated control method are therefore provided for controllably adjusting the phase and amplitude of the optical signals emitted by a plurality of fiber optic amplifiers so as to compensate for the otherwise deleterious effects of atmospheric turbulence. By controlling both the amplitude and phase front of the optical signals, the fiber optic phased array and associated method of the present invention can illuminate the target with optical signals of a desired amplitude, notwithstanding atmospheric turbulence. Moreover, the fiber optic phased array and associated control method repeatedly and controllably alter both the phase and the amplitude of the optical signals emitted by the fiber optic amplifiers to thereby take into account variations in the atmospheric turbulence over time.

According to one aspect of the present invention, a fiber optic phased array is provided that includes the plurality of fiber optic amplifiers, such as dual clad fiber amplifiers, for amplifying optical signals propagating therealong. The fiber optic phased array also includes a sensor assembly for detecting: (i) the phase of the optical signals that are emitted by the fiber optic amplifiers, and (ii) both the phase and the amplitude of the optical signals that have been reflected by the target. In one advantageous embodiment, the sensor assembly includes an outbound wavefront sensor for detecting the phase of the optical signals emitted by respective fiber optic amplifiers and transmitted toward the target. Additionally, the sensor assembly may include an atmospheric wavefront sensor for detecting the phase of the optical signals that have been reflected by the target. Further, the sensor assembly may include an amplitude sensor, such as a near field camera, for detecting the amplitude of the optical signals that have been reflected by the target.

The fiber optic phased array of this aspect of the present invention also includes a plurality of phase modulators, such as piezoelectric phase modulators, associated with the plurality of fiber optic amplifiers for controllably altering the phase of the respective optical signals propagating thereal-ong. The phase modulators are responsive to the sensor assembly and, in one embodiment, the outbound wavefront sensor and the atmospheric wavefront sensor, for altering the phase of the optical signals propagating along the respective fiber optic amplifiers in response to the phase of the optical signals emitted by the fiber optic amplifiers and the phase of the optical signals reflected by the target. Thus, the phase modulators may alter the phase of the optical signals propagating along the fiber optic amplifiers to compensate for modifications in the phase that will be subsequently introduced by downstream atmospheric turbulence.

The fiber optic phased array also includes a gain adjustment mechanism for controllably altering the amplitude of the optical signals propagating along respective fiber optic amplifiers in response to the amplitude of the optical signals reflected by the target and detected by the sensor assembly, such as the amplitude sensor. For example, the gain adjustment mechanism may include a plurality of pump sources for controllably pumping respective fiber optic amplifiers. Thus, the gain adjustment mechanism can controllably alter the amplitude of the optical signals emitted by the fiber optic amplifiers to compensate for the effects upon the amplitude that will be occasioned by the downstream atmospheric turbulence.

In one advantageous embodiment, the phase modulators and the gain adjustment mechanism are controlled such that the spatial distribution of the amplitude of the optical signals emitted by the fiber optic amplifiers matches the spatial distribution of the optical signals that have been reflected from the target in order to maximize the energy concentrated in a small spot on the target in an efficient manner. In this embodiment, the optical signals emitted by individual fiber optic amplifiers can be modulated to match the dynamic variations of the desired spatial distribution of the amplitude, as determined from the optical signals that have been reflected from the target.

Even though the amplitude of the optical signals emitted by the individual fiber amplifiers is varied, the total outgoing power may remain constant over time. In this regard, the total power of the system is often limited by the damage threshold of the individual fiber amplifiers which cannot exceed some time averaged power level. According to this aspect of the present invention, the nominal power emitted by each fiber amplifier is set at or slightly below the threshold such that in being modulated to follow the dynamics of the atmospheric scintillation, the actual power emitted by each fiber amplifier will fluctuate both above and below the threshold with the time averaged power level of the signals emitted by each fiber amplifier remaining at or slightly below the damage threshold, thereby maintaining a maximum average power as well as maximal efficiency in concentrating energy at the target.

Similarly the total power of the system is often limited by the power that can be supplied to it by the platform on which the system is hosted. According to this aspect of the present invention, the power emitted by each fiber amplifier is modulated so that the intensity of the transmitted beam follows the dynamically varying spatial distribution of the scintillation of the received beam. As such, the power supplied to each fiber amplifier will also be dynamically modulated. These individual dynamic modulations may be normalized such that their total sums to some constant level that does not exceed a predetermined limit, typically defined by the power supply limit. This enables transmission of maximum power and achieves maximum efficiency in concentrating energy at the target by distributing the power between the array of optical fiber amplifiers in an optimal manner.

According to another aspect of the present invention, a method of controllably illuminating a target is provided. Initially, optical signals that are propagating along a plurality of fiber optic amplifiers are amplified. The phase of the optical signals emitted by respective fiber optic amplifiers and transmitted toward the target is then detected. Subsequently, both the phase and the amplitude of the optical signals that have been reflected by the target are detected. Based upon the phase of the optical signals emitted by the respective fiber optic amplifiers and transmitted toward the target and the phase of the optical signals must have been reflected by the target, the phase of the optical signals propagating along respective fiber optic amplifiers is controllably altered. Additionally, the amplitude of the optical signals propagating along the fiber optic amplifiers may be similarly controllably altered in response to the amplitude of the optical signals reflected from the target. In this regard, the amplitude of the optical signals propagating along the respective fiber optic amplifiers may be altered by controllably pumping respective fiber optic amplifiers. As such, the method of this aspect of the present invention can compensate for the otherwise deleterious effects upon both phase and frequency occasioned by atmospheric turbulence.

Accordingly, the fiber optic phased array and associated method of the present invention can more precisely illuminate a target, both in terms of the phase and amplitude of the optical signal, even as the atmospheric turbulence varies. Additionally, the fiber optic phased array and associated method can reduce, if not eliminate, phase nulls and can therefore increase the power with which the target is illuminated.

BRIEF DESCRIPTION OF THE DRAWINGS

Figure 1:
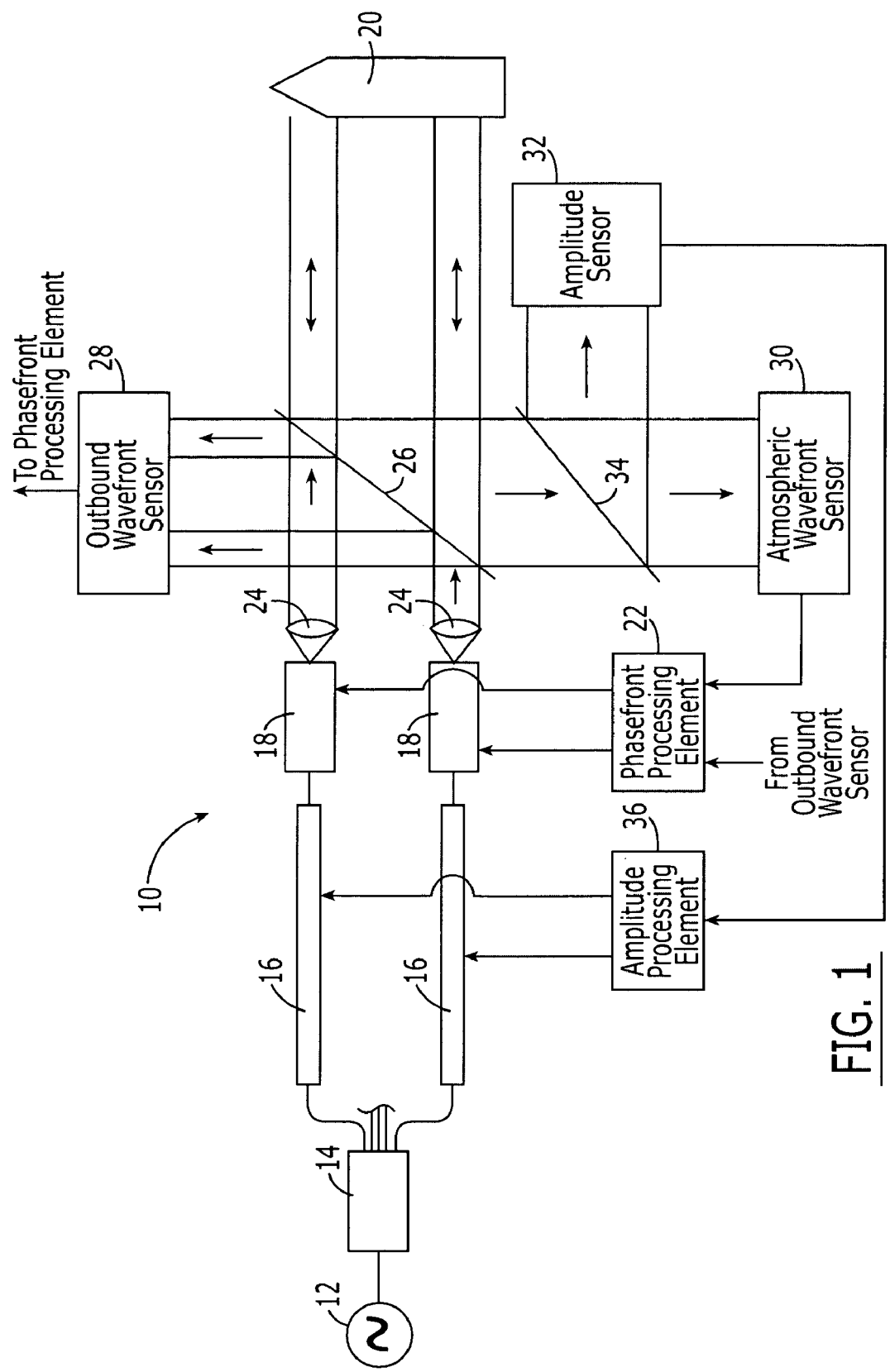
Figure 2:
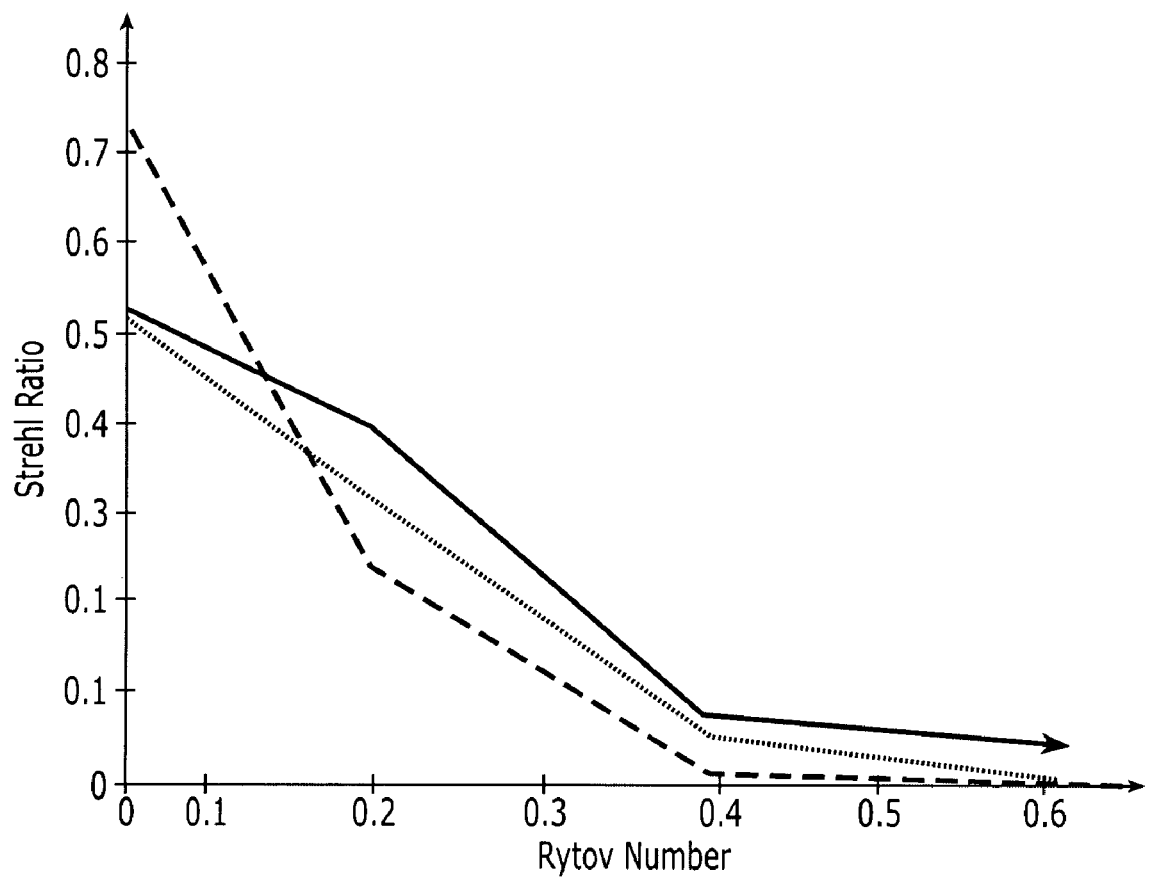

Having thus described the invention in general terms, reference will now be made to the accompanying drawings, which are not necessarily drawn to scale, and wherein:

FIG. 1 is a block diagram of a fiber optic phased array according to one embodiment of the present invention; and FIG. 2 is a graphical comparison of the Strehl ratio versus Rytov number for a fiber optic phased array according to one embodiment of the present invention relative to a conventional adaptive optic control technique.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a fiber optic phased array 10 according to one aspect of the present invention is depicted. The fiber optic phased array 10 is depicted in which an optical signal from a master oscillator 12 is split one or more times and then amplified. The amplified optical signals may then be combined, if desired, to produce an output optical signal having a greater power level than that originally provided by the master oscillator. Although described briefly herein, further details regarding many components of the fiber optic phased array are provided by U.S. Pat. Nos. 5,694,408 and 5,832,006.

As shown in FIG. 1, the master oscillator 12 provides an input signal that has a predefined frequency and power level, such as a frequency of 281.95 THz (and a corresponding wavelength of 1.064 microns) and a power level of approximately 20 mW. In addition, since the master oscillator is generally chosen to have a $TEM_{00}$ single frequency, it will also have a predetermined wavelength and linewidth. While the master oscillator may be embodied by various devices, the master oscillator may be a diode pumped fiber laser, a single mode diode laser or diode pumped rods, slabs or mirrors or the like.

The fiber optic phased array 10 may include a beam splitter 14 for splitting the input signal provided by the master oscillator 12 into a plurality of optical signals—two of which are shown completely in FIG. 1 for purposes types of beam splitters may be utilized, the beam splitter may be a dichroic filter, a partial transmission beam splitter, a fiber optic combiner, an integrated optic combiner or the like. The fiber optic phased array also includes a plurality of fiber optic amplifiers 16 for receiving and amplifying respective ones of the optical signals produced by the beam splitter. In this regard, the fiber optic amplifiers may be dual clad optical fibers having an inner core doped with one or more rare earth elements, such as ytterbium, neodymium, praseodymium, erbium, holmium and thulium, an outer core surrounding the inner core and a cladding layer surrounding the outer core. As known to those skilled in the art, a fiber optic amplifier of this type will amplify the optical signal when the fiber optic amplifier is excited by a pump signal. Although not shown, the fiber optic phased array therefore also generally includes one or more pump sources, such as those described by U.S. Pat. No. 5,694,408 including, for example, a laser diode, a laser diode array, a fiber optic laser or other suitable pump laser, for exciting the fiber optic amplifiers in order to provide the desired amplification of the optical signals.

In the embodiment described above and illustrated in FIG. 1, the input signal provided by the master oscillator 12 is only split one time, albeit in different ways, in order to provide the optical signals to a single stage of fiber optic amplifiers 16. Alternatively, the optical signals may be split and amplified two or more times if an output laser beam having an even larger power level is desired. As described by the U.S. Pat. No. 5,694,408, for example, the amplified optical signal produced by each fiber optic amplifier of the embodiment depicted in FIG. 1 may each be split and subsequently further amplified by another stage of fiber optic amplifiers prior to being combined to produce a high power output laser beam, if so desired.

In accordance with the present invention, the respective phases of the amplified optical signals emitted by the fiber optic amplifiers 16 are controlled such that the resulting phasefront can be controlled to have either a flat phasefront in which each amplified optical signal has the same phase or a phasefront having another predefined shape or tilt. In order to control the phase of the amplified optical signals, the fiber optic phased array 10 generally includes a plurality of phase modulators 18, one of which is associated with each fiber optic amplifier. Thus, the phase of the optical signals emitted by the fiber optic amplifiers can be individually modulated as described below prior to being transmitted toward a target 20 or the like. The fiber optic phased array can include various types of phase modulators, such as liquid crystal modulators, electro-optic phase modulators, in-line fiber optic modulators or the like. In the illustrated embodiment, however, the fiber optic phased array includes a plurality of piezoelectric phase modulators, one of which is associated with each fiber optic amplifier. As described below, each phase modulator is responsive to control signals, such as those provided by a phase front processing element 22, such as a microcontroller, in order to controllably adjust the phase of the optical signals emitted by the respective fiber optic amplifiers.

The fiber optic phased array 10 may also include a collimating lens or other collimating or fill optics 24 associated with each fiber optic amplifier 16 for collimating the optical signals emitted by the respective fiber optic amplifier prior to being output. As shown in FIG. 1, for example, the collimating lens may be disposed downstream of the phase modulators 18 such that optical signals are collimated following phase modulation. Once collimated, the optical signals are output. Although not necessary to the present invention, the collimated optical signals may be recombined, if desired. As a result of the amplification provided by the plurality of the fiber optic amplifiers, however, the combination of the optical signals will generally have a much greater power level than the input signal originally provided by the master oscillator 12.

Although not depicted in FIG. 1, the fiber optic phased array 10 may also include a transport fiber array. The transport fiber array comprises a plurality of optical fibers, at least one of which is associated with each fiber optic amplifier 16, i.e., with each channel of the fiber optic phased array. The optical signals emitted by the fiber optic amplifiers may propagate via respective optical fibers of the transport fiber array to the aperture defined by the collimating optics 24 via which the optical signals are emitted. Thus, the fiber optic amplifiers, as well as other components of the fiber optic phased array, may be positioned remote from the aperture at which the optical signals are emitted, if so desired.

According to the present invention, the phase and the amplitude of the optical signal are controlled based upon the phase and the amplitude of the signals reflected by the target 20. In order to provide a frame of reference for the control of the phase of the optical signals, the phase of the optical signals emitted by the fiber optic phased array 10 is monitored. In this regard, the fiber optic phased array may include a beam splitter 26 positioned downstream of the fiber optic amplifiers 16 and, more particularly, downstream of the collimating lenses 24 for sampling the optical signals emitted by the fiber optic phased array. While the embodiment of the fiber optic phased array depicted in FIG. 1 includes a single beam splitter, multiple beam splitters could be utilized, including an array of beam splitters with one beam splitter associated with each fiber optic amplifier. Typically, these beam splitters do not evenly split the amplified optical signals. Instead, a majority of the amplified optical signal, such as 90%, 95% or more of the amplified optical signal, is output, while the remainder of the amplified optical signal is redirected so as to be evaluated in accordance with the phase control aspects of the present invention. Thus, the beam splitter disposed downstream of the fiber optic amplifiers effectively serves to sample the amplified optical signals for purposes of control and feedback. As before, the beam splitter disposed downstream of the fiber optic amplifier may be embodied in many different manners and may be, for example, a dichroic filter, a partial transmission beam splitter, a fiber optic combiner, an integrated optic combiner or the like.

The respective samples of the amplified optical signals are directed to an outbound wavefront sensor 28. The outbound wavefront sensor may be embodied in many different manners. In one embodiment, for example, the outbound wavefront sensor may be comprised of a plurality of optical fibers, one of which is associated with and receives the optical signals emitted by each fiber optic amplifier 16. The respective samples of the amplified optical signals that are captured by the outbound wavefront sensor are compared to corresponding optical signals that have been reflected from a target 20.

In this regard, the fiber optic phased array 10 may also include a beam splitter for diverting the optical signals that have been reflected from the target 20 to an atmospheric wavefront sensor 30. Although the fiber optic phased array may include various types of beam splitters, the same beam splitter 26 that samples the outbound optical signals may be utilized to divert the reflected signals to the atmospheric wavefront sensor. Alternatively, the fiber optic phased array may include different beam splitters for splitting the optical signals emitted by the fiber optic phased array and for diverting the optical signal reflected by the target to the atmospheric wavefront sensor.

The atmospheric wavefront sensor 30 may also be embodied in several different manners. In one embodiment, the atmospheric wavefront sensor may also be embodied by a plurality of optical fibers that are arranged such that the location at which each optical fiber of the atmospheric wavefront sensor receives the optical signals reflected from the target 20 is positionally correlated with the signal transmitted by a respective fiber optic amplifier. Thus, each optical fiber of the atmospheric wavefront sensor is associated and in optical communication with a respective fiber optic amplifier and is correspondingly paired with an optical fiber of the outbound wavefront sensor 28 that samples the optical signals emitted by the same fiber optic amplifier. The atmospheric wavefront may also include collecting optics to reimage the reflected optical signals to another plane, typically by demagnifying the reflected optical signals so as to be focused upon and be sized to match the plurality of optical fibers.

The phase of the optical signals captured by the outbound wavefront sensor 28 and the atmospheric wavefront sensor 30 are typically provided to the phasefront processing element 22. The phasefront processing element may be configured to operate in a variety of different manners depending upon the intended application of the fiber optic phased array. In one embodiment, however, the phasefront processing element compares the phase of each optical signal sampled by the outbound wavefront sensor with the phase of the corresponding optical signal reflected from the target 20. The phase of the optical signals may be compared in various manners including mixing the optical signals to create an interference pattern that may be analyzed to determine the phase shift therebetween. By comparing the phase of corresponding signals captured by the outbound wavefront sensor and the atmospheric wavefront sensor, the effect of atmospheric turbulence on the optical signals may be characterized. Without compensation the phase perturbations induced by atmospheric turbulence will broaden and distort the amplitude of the beam at the target preventing optimal concentration of power. Thus, the phasefront processing element can determine any changes in the phase of the optical signals emitted by the fiber optic phased array 10 that are required to compensate for the degrading effects of atmospheric turbulence, as described below. Depending upon its configuration, the phasefront processing element can similarly impose a predefined tilt or other shape upon the phasefront that is incident upon the target, if so desired.

As shown in FIG. 1, the phasefront processing element 22 controls each of the phase modulators 18 to appropriately alter the phase of the optical signals emitted by the respective fiber optic amplifier 16 based upon the phase of the optical signals emitted by the fiber optic amplifier and the current effects of atmospheric turbulence. As will be apparent, the phase modulation provided by the fiber optic phased array 10 of the present invention will generally vary over time as the phase is adjusted to provide continuous compensation of the dynamic fluctuations of atmospheric turbulence. For example, the scintillation pattern generated by atmospheric turbulence typically varies on the order of milliseconds so the phase modulator provided by the fiber optic phased array may need to vary at this same rate.

In addition to controllably altering the phase of the optical signals emitted by the fiber optic amplifiers 16, the amplitude of the optical signals emitted by the fiber optic amplifiers may be similarly adjusted. In this regard, the fiber optic phased array 10 may include an amplitude sensor 32, such as a near field camera, for detecting the amplitude of the optical signals that have been reflected by the target 20. As shown in FIG. 1, the optical signals that have been reflected by the target are directed not only to an atmospheric wavefront sensor 30, but also to an amplitude sensor that captures the amplitude of the optical signal. In order to direct some portion of the reflected optical signals to the amplitude sensor, the fiber optic phased array may include another beam splitter 34 for dividing the reflected optical signals between the atmospheric wavefront sensor and the amplitude sensor.

As described above in conjunction with the atmospheric wavefront sensor 30, the amplitude of the optical signals is generally positionally correlated with the optical signals that have been emitted by respective fiber optic amplifiers 16. Thus, the amplitude sensor 32 is preferably configured to separately detect the spatial distribution of the amplitude of the optical signals reflected from the target beacon as perturbed by scintillation effects induced by propagation through the intervening atmosphere, and to provide the capability to compare this distribution to the optical signals emitted by each fiber optic amplifier.

The fiber optic phased array 10 may also include an amplitude processing element 36, such as a microprocessor or the like, responsive to the amplitude sensor 32 for analyzing the amplitude of the optical signals that have been reflected by the target 20. In this regard, the amplitude processing element may compare the amplitude of the optical signals that have reflected from the target with a predefined amplitude profile, such as a flat amplitude profile in which all of the optical signals have been reflected by the target are anticipated to have a common amplitude. Based upon this analysis, the amplitude processing element drives a gain adjustment mechanism for controllably altering the amplitude of the optical signals propagating along the respective fiber optic amplifiers 16. The highest efficiency in concentrating beam power onto a tight spot at the target is achieved when the amplitude profile of the outgoing beam matches the profile of the target's reflection after propagation back to the fiber optic phased array. In instances in which such power concentration is desired the amplitude processing element may drive the gain adjustment mechanism such that the amplitude of the optical signals propagating along the respective fiber optic amplifiers are altered to match the amplitude profile of the optical signals reflected from the target. In achieving other beam shapes at the target a different transmitted amplitude profile may be optimal for both compensating for the effects of atmospheric turbulence and performing the desired beam shaping. For example, when it is desired to illuminate one or more targets, the optical amplitude profile would typically be uniform over the target extent with minimal energy extending beyond the target extent. In this case, the amplitude probe of the transmittal signals would be defined in advance such that the outgoing beam's amplitude may be similarly modulated to match the desired profile while compensating for the effects of atmospheric turbulence. The amplitude of the optical signals may be adjusted in various manners. However, in one embodiment, the gain adjustment mechanism comprises the plurality of pump sources for controllably pumping respective ones of the fiber optic amplifiers.

The analysis of the amplitude of the reflected optical signals is also advantageous in increasing the intensity of the optical signals incident upon the target 20. In this regard, the amplitude processing element 36 can identify those reflected optical signals that have been attenuated the least. For those fiber optic phased arrays 10 that have a limit on the total output power, but that have some flexibility, at least for limited periods of time, in the power output by each fiber optic amplifier 16, the amplitude processing element can drive the fiber optic amplifiers that are emitting the least attenuated optical signals to provide optical signals with even more intensity, while correspondingly reducing the intensity of the optical signals emitted by the fiber optic amplifiers that are emitting the most attenuated optical signals. By trading off optical intensity between the fiber optic amplifiers, the optical power delivered to the target can be increased while maintaining the overall power in the optical signals emitted by the fiber optic phased array at about the same level.

The limit on total output power of a fiber optic phased array 10 is often based on the damage thresholds of the individual fiber amplifiers 16 which define a time averaged power level such that sustained operation of the fiber amplifiers above the threshold may damage the fiber amplifiers. By controlling the amplitude of the optical signals emitted by the fiber amplifiers, the average amplitude of the optical signals emitted by the fiber amplifiers may be set at or slightly below the damage threshold while permitting the amplitude to occasionally exceed the damage threshold for a limited period of time, thereby further increasing the power that can be delivered to the target 20. Similarly the total output power of a fiber optic phased array system may also be limited by the power that can be supplied to the fiber optic phased array system by the platform on which the fiber optic phased array system is hosted. By controlling the amplitude of the power supplied to each fiber amplifier and correspondingly modulating the power emitted by each fiber amplifier, such as by means of the amplitude processing element and the gain adjustment mechanism, the total power drawn may be set at some constant value such that the system does not exceed a predetermined limit, that is, the power supply limit. This enables transmission of maximum power and achieves maximum efficiency in concentrating energy at the target by distributing the power between the array of optical fiber amplifiers in an optimal manner.

Another advantage of the fiber optic phased array 10 and method of the present invention and their for compensation for the degrading effects of atmospheric turbulence or other random media on the wavefront phase is its robustness to branch points and scintillation. These effects strongly degrade the performance of conventional systems at scintillation levels characterized by Rytov numbers exceeding 0.05. Branch points occur at locations in which the amplitude of the field is zero, i.e. intensity nulls. At such points, the phase of the field is undefined and the phase is found to increase by a total of $2\pi$ in traversing a small closed loop around the branch point. The performance of conventional adaptive optics that use conventional wavefront sensors such as Shack-Hartman and shearing interferometers and/or that use continuous deformable mirrors to correct the wavefront is significantly degraded by branch points and scintillation. This degradation is due to two factors.

First, such sensors measure the wavefront slope not the direct phase and require a wavefront reconstruction step. Branch points and scintillation induced measurement biases as well as measurement noise limit the accuracy of the wavefront reconstruction step. Since the present invention measures the phase directly, no reconstruction step is needed, and the system is largely immune to these degrading effects. Second, the phase of an electromagnetic field containing branch points cannot be uniquely mapped to a real valued function and requires choices in the placement of branch cuts (2π discontinuities). However, such a mapping is necessary for the control of a continuous deformable mirror. This inherently limits the ability of a system using a deformable mirror to achieve the desired shape needed to compensate for the wavefront phase. Furthermore, a system that attempts to address the branch point related component of the field's phase, requires the implicit or explicit placement of branch points. Dynamic changes in these choices must be made as the field evolves and number and location of branch points change, making closed-loop control methods subject to instability and most likely requiring complicated control laws.

Since the fiber optic phased array 10 and method of the present invention directly modulate the complex phase, no mapping of the phase onto a real function is necessary. Control of the phase is performed individually for each fiber amplifier 16 of the array and is straightforward.

In this regard, the improved performance of a fiber optic phased array 10 according to one embodiment of the present invention is depicted in conjunction with FIG. 2. In this figure, the Strehl ratio is plotted relative to the Rytov number. As known to those skilled in the art, the Strehl ratio is a measure the peak intensity of a diffraction limited signal, while the Rytov number is a function of the atmospheric scintillation as described above. With respect to FIG. 2, the performance of a conventional adaptive optic system is depicted by the dashed line, the performance of a fiber optic phased array-based system incorporating only phase control is depicted by the dotted line and the performance of a fiber optic phased array-based system of one embodiment of the present invention incorporating both phase and amplitude control is depicted by the solid line. As shown by FIG. 2, the fiber optic phased array of one embodiment of the present invention provides improved performance for larger Rytov numbers, such as in instances in which there is significant atmospheric turbulence or scintillation.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber optic phased array comprising:
   a plurality of fiber optic amplifiers for amplifying respective optical signals propagating therealong;
   an outbound wavefront sensor for detecting the phase of the optical signals emitted by respective fiber optic amplifiers and transmitted toward a target;
   an atmospheric wavefront sensor for detecting the phase of the optical signals that have been reflected by the target;
   a plurality of phase modulators associated with said plurality of fiber optic amplifiers for controllably altering the phase of the respective optical signals propagating therealong in response to the phase of the optical signals detected by said outbound wavefront sensor and said atmospheric wavefront sensor;
   an amplitude sensor for detecting the amplitude of the optical signals that have been reflected by the target; and
   a gain adjustment mechanism for controllably altering the amplitude of the optical signals propagating along respective fiber optic amplifiers in response to the amplitude of the optical signals detected by said amplitude sensor, wherein said gain adjustment mechanism controllably alters the amplitude of the optical signals propagating along the respective fiber optic amplifiers such that a time-average of the amplitude of the optical signals emitted by each fiber optic amplifier is no greater than a damage threshold of the respective fiber optic amplifier while permitting the amplitude of the optical signals emitted by at least one fiber optic amplifier to temporarily exceed the damage threshold of the respective fiber optic amplifier.

2. A fiber optic phased array according to claim 1 wherein the plurality of fiber optic amplifiers draw power from a power supply, and wherein said gain adjustment mechanism controllably alters the optical signals propagating along the respective fiber optic amplifiers such that the total power drawn by the plurality of fiber optic amplifiers is less than a predetermined limit.

3. A fiber optic phased array according to claim 1 wherein said gain adjustment mechanism comprises a plurality of pump sources for controllably pumping respective fiber optic amplifiers.

4. A fiber optic phased array according to claim 1 wherein said amplitude sensor comprises a near field camera.

5. A fiber optic phased array according to claim 1 wherein said plurality of phase modulators comprise a plurality of piezoelectric phase modulators.

6. A fiber optic phased array according to claim 1 wherein said plurality of fiber optic amplifiers comprises a plurality of dual clad fiber amplifiers.

7. A fiber optic phased array comprising:
   a plurality of fiber optic amplifiers for amplifying respective optical signals propagating therealong;
   a sensor assembly for detecting the phase of the optical signals that are emitted by said fiber optic amplifiers and both the phase and the amplitude of the optical signals have been reflected by a target;
   a plurality of phase modulators responsive to said sensor assembly and associated with said plurality of fiber optic amplifiers for controllably altering the phase of the respective optical signals propagating therealong in response to the phase of the optical signals emitted by said fiber optic amplifiers and the phase of the respective optical signals reflected by the target; and
   a gain adjustment mechanism for controllably altering the amplitude of the optical signals propagating along respective fiber optic amplifiers in response to the amplitude of the optical signals reflected by the target and detected by said sensor assembly, wherein said gain adjustment mechanism controllably alters the amplitude of the optical signals propagating along the respective fiber optic amplifiers such that a time-average of the amplitude of the optical signals emitted by each fiber optic amplifier is no greater than a damage threshold of the respective fiber optic amplifier while permitting the amplitude of the optical signals emitted by at least one fiber optic amplifier to temporarily exceed the damage threshold of the respective fiber optic amplifier.

8. A fiber optic phased array according to claim 7 wherein the plurality of fiber optic amplifiers draw power from a power supply, and wherein said gain adjustment mechanism controllably alters the optical signals propagating along the respective fiber optic amplifiers such that the total power drawn by the plurality of fiber optic amplifiers is less than a predetermined limit.

9. A fiber optic phased array according to claim 7 wherein said gain adjustment mechanism comprises a plurality of pump sources for controllably pumping respective fiber optic amplifiers.

10. A fiber optic phased array according to claim 7 wherein said sensor assembly comprises:
  an outbound wavefront sensor for detecting the phase of the optical signals emitted by respective fiber optic amplifiers and transmitted toward the target; and
  an atmospheric wavefront sensor for detecting the phase of the optical signals that have been reflected by the target.

11. A fiber optic phased array according to claim 7 wherein said sensor assembly comprises an amplitude sensor for detecting the amplitude of the optical signals that have been reflected by the target.

12. A fiber optic phased array according to claim 11 wherein said amplitude sensor comprises a near field camera.

13. A fiber optic phased array according to claim 7 wherein said plurality of phase modulators comprise a plurality of piezoelectric phase modulators.

14. A fiber optic phased array according to claim 7 wherein said plurality of fiber optic amplifiers comprises a plurality of dual clad fiber amplifiers.

15. A method of controllably illuminating a target comprising:
  amplifying optical signals propagating along a plurality of fiber optic amplifiers;
  detecting the phase of the optical signals emitted by respective fiber optic amplifiers and transmitted toward the target;
  detecting both the phase and the amplitude of the optical signals that have been reflected by the target;
  controllably altering the phase of the optical signals propagating along respective fiber optic amplifiers in response to the phase of the optical signals transmitted toward and reflected by the target; and
  controllably altering the amplitude of the optical signals propagating along respective fiber optic amplifiers in response to the amplitude of the optical signals reflected by the target, wherein controllably altering the amplitude of the optical signals propagating along the respective fiber optic amplifiers comprises controllably altering the amplitude of the optical signals propagating along the respective fiber optic amplifiers such that a time-average of the amplitude of the detected optical signals that were emitted by each fiber optic amplifier is no greater than a damage threshold of the respective fiber optic amplifier while permitting the amplitude of the optical signals emitted by at least one fiber optic amplifier to temporarily exceed the damage threshold of the respective fiber optic amplifier.

16. A method according to claim 15 wherein the plurality of fiber optic amplifiers draw power from a power supply, and wherein controllably altering the amplitude of the optical signals propagating along the respective fiber optic amplifiers comprises controllably altering the amplitude of the optical signals propagating along the respective fiber optic amplifiers such that the total power drawn by the plurality of fiber optic amplifiers is less than a predetermined limit.

17. A method according to claim 15 wherein controllably altering the amplitude of the optical signals propagating along the respective fiber optic amplifiers comprises controllably pumping respective fiber optic amplifiers.

* * * * *